(12) United States Patent
Schofield

(10) Patent No.: US 12,544,626 B2
(45) Date of Patent: Feb. 10, 2026

(54) CLIMBING STICK SYSTEM

(71) Applicant: Double Dragon International, Inc., Dubuque, IA (US)

(72) Inventor: Randy L. Schofield, Harrisburg, MO (US)

(73) Assignee: Double Dragon International, Inc., Dubuque, IA (US)

( * ) Notice: Subject to any disclaimer, the term of this patent is extended or adjusted under 35 U.S.C. 154(b) by 913 days.

(21) Appl. No.: 17/839,226

(22) Filed: Jun. 13, 2022

(65) Prior Publication Data

US 2023/0398409 A1    Dec. 14, 2023

(51) Int. Cl.
| | | |
|---|---|---|
| A63B 27/00 | (2006.01) | |
| E06C 1/34 | (2006.01) | |
| A01M 31/02 | (2006.01) | |

(52) U.S. Cl.
CPC .............. *A63B 27/00* (2013.01); *E06C 1/34* (2013.01); *A01M 31/02* (2013.01)

(58) Field of Classification Search
CPC . A63B 27/00; E06C 1/34; E06C 1/381; E06C 7/08; A01M 31/02; A01M 31/00
See application file for complete search history.

(56) References Cited

U.S. PATENT DOCUMENTS

| | | | | |
|---|---|---|---|---|
| 5,439,072 | A * | 8/1995 | Jenkins, Jr. | E06C 7/081 |
| | | | | 182/100 |
| 8,556,035 | B1 * | 10/2013 | Kendall | E06C 1/381 |
| | | | | 182/189 |
| 9,732,556 | B2 * | 8/2017 | Priest | E06C 1/381 |
| 10,973,224 | B2 * | 4/2021 | Infalt | E06C 1/38 |
| 11,808,085 | B2 * | 11/2023 | Power, II | A63B 27/00 |
| 2004/0216952 | A1 * | 11/2004 | Woller | A01M 31/00 |
| | | | | 182/100 |
| 2018/0073298 | A1 * | 3/2018 | Hand | E06C 1/381 |

* cited by examiner

*Primary Examiner* — David E Martinez
(74) *Attorney, Agent, or Firm* — Rathe Lindenbaum LLP

(57) ABSTRACT

A climbing stick system may include a first climbing stick and a second climbing stick: The first climbing stick is stackable on the second climbing stick in an axially offset relationship to the second climbing stick. When stacked, the post of the second climbing stick is received within an open sided channel of the first climbing stick, wherein a compressible layer is compressed between the post of the second climbing stick and the open sided channel of the first climbing stick.

20 Claims, 7 Drawing Sheets

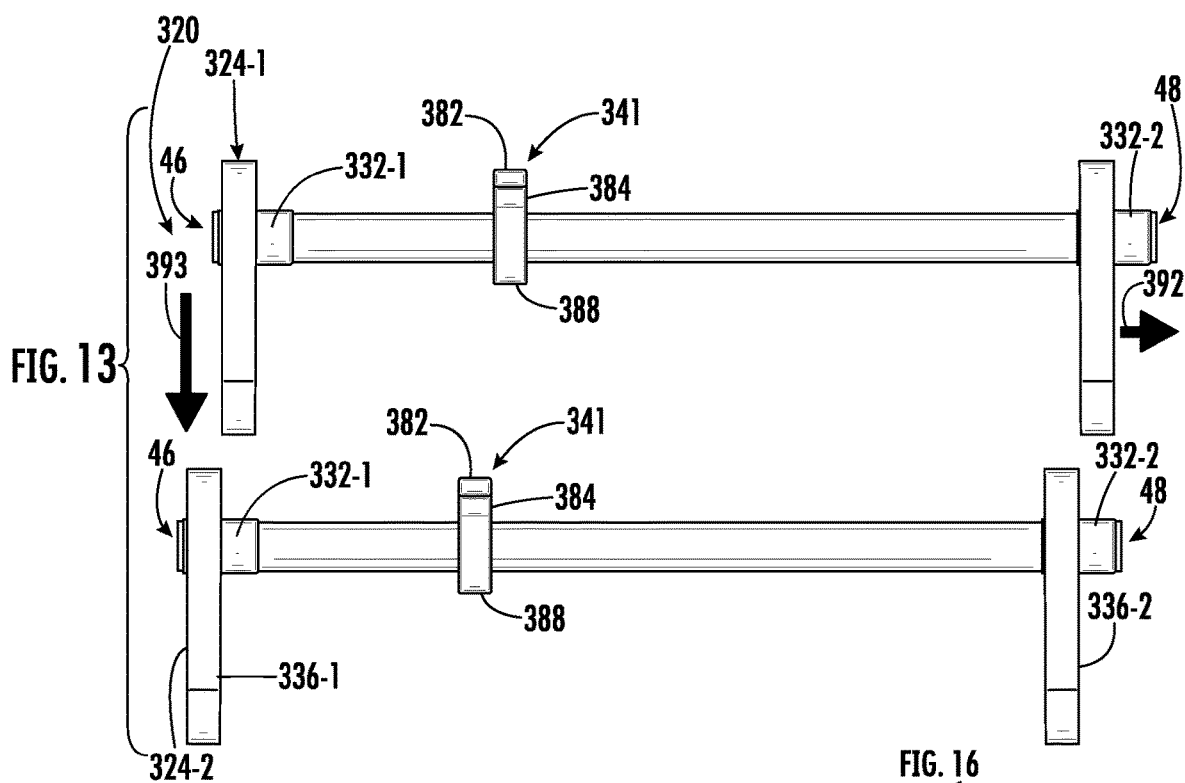
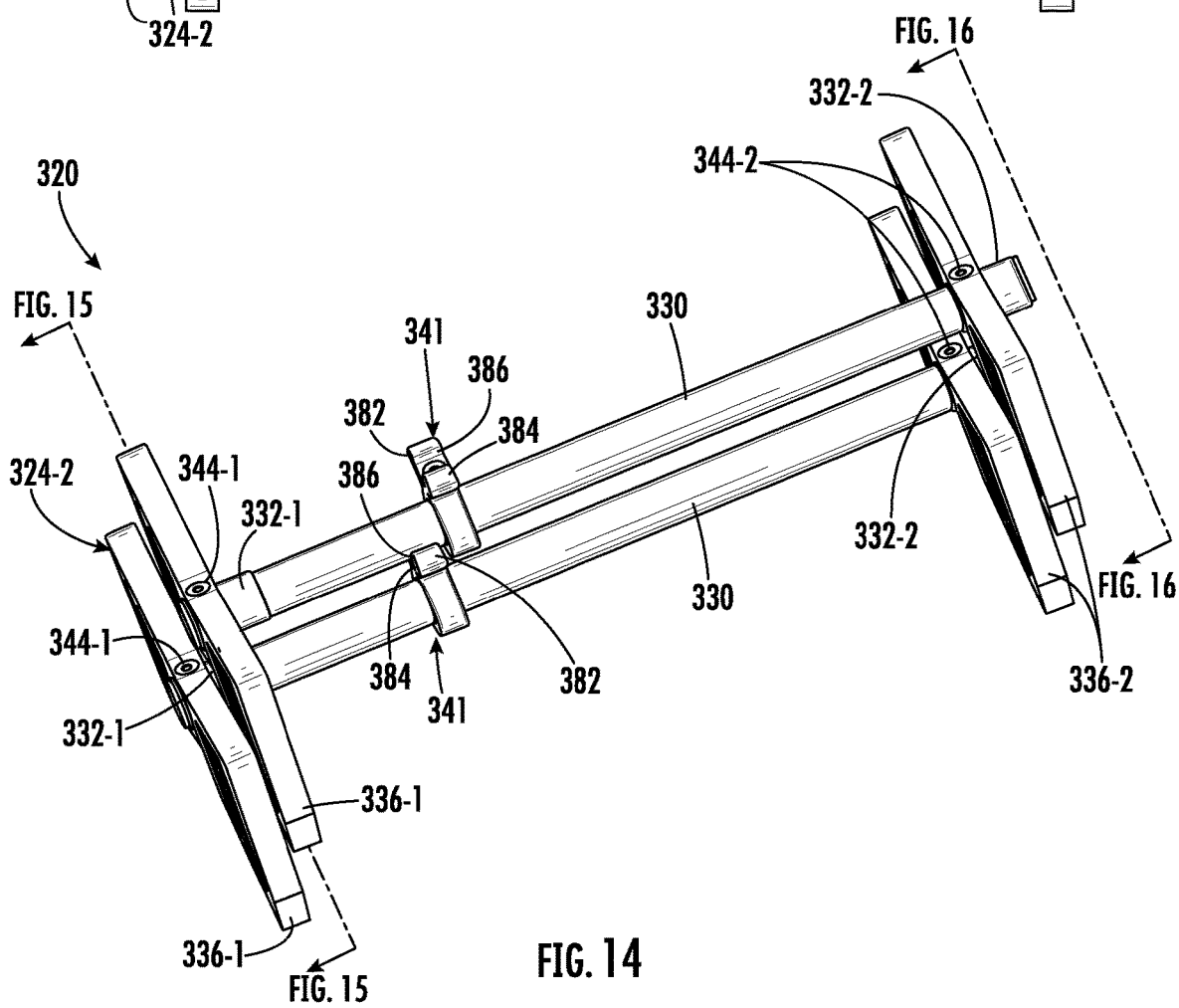

CLIMBING STICK SYSTEM

CROSS-REFERENCE TO RELATED PATENT APPLICATIONS

The present application is related to co-pending US Patent Application Ser. No. 17839105 filed on the same day herewith by Randy L. Schofield and entitled TREE ASCENT APPARATUS, the full disclosure of which is hereby incorporated by reference.

BACKGROUND

Tree climbing sticks are typically mounted along a tree and serve as a ladder for a person to reach a higher tree stand for wildlife observation or hunting. As such tree climbing sticks are often used in remote areas, transporting such tree climbing sticks and tree stands is often difficult.

BRIEF DESCRIPTION OF THE DRAWINGS

FIG. 13 is a side view of the example climbing stick system of FIG. 6 illustrating two of the example climbing sticks of FIG. 6 being axially offset relative to one another prior to stacking.

FIG. 14 is a top perspective view of the climbing stick system of FIG. 13 following the stacking and joining of the two example climbing sticks.

Figure 1:
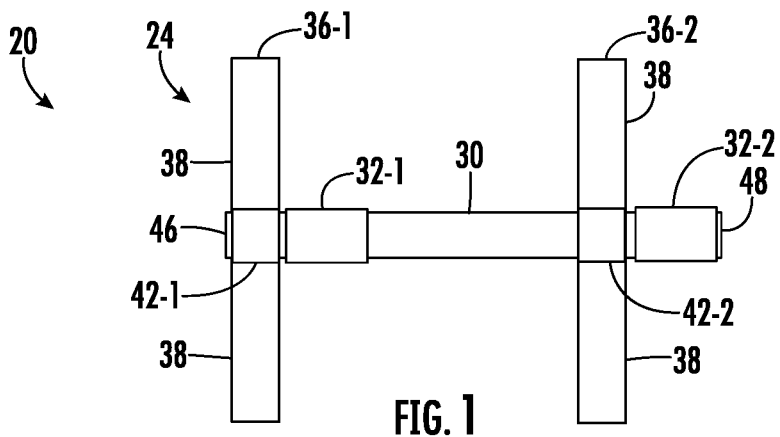
FIG. 1 is a diagram illustrating an example climbing stick as part of an example climbing stick system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example climbing stick systems that facilitate the stacking and releasable connection of multiple individual climbing sticks for compact storage and transport. The example climbing stick systems may include a first climbing stick and a second climbing stick. The first climbing stick is stackable on the second climbing stick in an axially offset relationship to the second climbing stick. When stacked, the post of the second climbing stick is received within an open sided channel of the first climbing stick, wherein a compressible layer is compressed between the post of the second climbing stick and the open sided channel of the first climbing stick.

In some implementations, the example climbing stick systems may include climbing sticks comprising a post supporting inwardly compressible layers secured to the post and tree gripping claws having open sided channels. When the climbing sticks are stacked in an offset relationship, the open sided channels of a first climbing stick receiving compress the inwardly compressible layers of a second climbing stick to releasably connect the first and second climbing sticks. The open sided channels provided on the tree gripping claws and the inwardly compressible layers provided on the post achieve compact and intuitive stacking and releasable connection of multiple climbing sticks with few parts, low complexity and low cost.

The configuration of the example climbing stick systems may facilitate the use of cylindrical posts. Because the claws of the first climbing stick snap or fit about the inwardly compressible layer supported by the post of the second climbing stick, the post may have a cylindrical and/or tubular shape. This may further assist in reducing the cost of the climbing stick system.

In some implementations, the first inwardly compressible layer may comprise a tube of material that is heat shrunk about the post. As a result, assembly time and costs are reduced. In some implementations, an adhesive may be applied between the tube and the post prior to such heat shrinking. In other implementations, additional fasteners or methods may be used to secure the inwardly compressible layer to the post.

In some implementations, the first inwardly compressible layer may comprise a rubber, rubber-like, compressible polymer or fabric tape wrapped about the post. In some implementations, the tape may include an adhesive for further securement of the tape about the post. In some implementations, the tape may be elastic, being stretched about the post and having its end adhesively secured to itself or to the post. In some implementations, the tape wrapped about the post may form a single layer of material. In some implementations, the tape may be wrapped about itself such that the layer is composed of multiple overlapping layers.

In some implementations, each climbing stick may be provided with a cleat projecting from the post in a direction opposite to the direction in which the claws project from the post. The cleat may include a notch that is sized to receive a portion of the post. As result, the notch of the cleat of the second climbing stick may receive of the post of the first climbing stick to inhibit relative rotation of the climbing sticks when stacked.

In some implementations, the post may be formed from a metal, such as aluminum, or a carbon fiber, wherein the inwardly compressible layers are formed from a compressible material such as rubber, a synthetic rubber or a polymer. In some implementations, the inwardly compressible layers each have a thickness of at least 0.2 mm and a Shore A durometer of no greater than 100.

In some implementations, one or both of the claws may also function as a step or be connected to a step. In some implementations, one or both of the claws may be integrally formed as a single unitary body with the step. In some implementations, the open sided channel in the claw may be formed in a portion of the claw that also serves as the step. In some implementations, the open sided channel extends adjacent to and between angled toothed edges of the claw. In some implementations, the open sided channel extends on an opposite side of the claw, facing away from the opening of the claw that receives or wraps about a tree.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

FIG. 1 is a diagram illustrating portions of an example climbing stick system 20. Climbing stick system 20 may comprise multiple individual climbing sticks similar to the individual climbing stick 24 shown in FIG. 1. Climbing stick system 20 facilitates the stacking and releasable connection of multiple individual climbing sticks 24 for compact storage and transport. Climbing stick 24 comprises post 30, inwardly compressible layers 32-1, 32-2 (collectively referred to as layers 32), and claws 36-1, 36-2 (collectively referred to as claws 36).

Post 30 comprises a structure interconnecting and supporting claws 36. Post 30 may comprise an elongate tube having a circular, oval or polygonal cross-section. Post 30 may be formed from a metal, such as aluminum, a polymer or other material such as a carbon fiber material. Post 30 has a length of at least 100 mm and no greater than 1000 mm so as to support claws 36 for supporting steps along a tree.

Layers 32 extend along exterior portions of post 30. Layers 32 are formed from a resiliently compressible material such as a rubber or rubber-like material. Examples of the material from which layers 32 are formed include, but are not limited to, urethane, polytetrafluoroethylene (TEFLON), nylon, fabric, plastic. Layers 32 are configured to be inwardly compressed while releasably retaining another climbing stick in a stacked relationship to climbing stick 24. Layers 32 may have a Shore A durometer of no greater than 100 for securing and adjacent stacked climbing stick.

In the example illustrated, each of layers 32 comprises a tube or sleeve of resiliently compressible material, such as urethane, polytetrafluoroethylene (TEFLON), nylon, fabric, plastic, which is slid over and along post 30 to a selected location and then is heat shrunk about the post 30 to secure the layer 32 in place. In some implementations, an additional layer of adhesive may be applied between each of layers 32 and post 30. In the example illustrated, post 30 has a cylindrical cross-section and a uniform diameter along its length, wherein the combined diameter of post 30 and an individual layer 32-1 or 32-2 is equal to the diameter of post 30 and twice the thickness of the heat shrunk sleeve wall providing layer 32-1 or 32-2.

In some implementations, post 30 may have a slightly recessed or smaller diameter in those portions that are to underlie layers 32-1 and 32-2, wherein such circumferential recesses assist in locating the individual sleeves forming layers 32 prior to the heat shrinking of the sleeves. Such recesses may further assist in inhibiting axial sliding of the sleeves following the shrinking of the sleeves. In such implementations, the recess may have a depth less than the thickness of the sleeve such that layers 32 projects beyond the surrounding exterior surface of post 30.

In other implementations, layers 32 may be formed and/or secured to post 30 in other fashions. For example, in some implementations, the sleeves forming layers 32 may not be heat shrunk but may be merely adhesively bonded or joined to post 30. In some implementations, the sleeves forming layers 32 may not be heat shrunk but may be slid along post 30 until being resiliently snapped or popped into the circumferential recesses formed in post 30. In some implementations, the circumferential recesses into which the sleeves forming layers 32 are resiliently popped may include an adhesive for further securing and retaining the sleeves within the recesses in selected axial positions along post 30. In some implementations, post 30 may include apertures at selected locations along post 30, whereas the sleeves forming layer 32 may include projections or plugs extending from the inner diameter of the sleeve, wherein the projections or plugs are resiliently popped or snapped into the apertures to axially retain the sleeves in place along post 30. In implementations, layers 32 may be coated upon or molded about post 30.

In some implementations, layers 32 may each comprise a rubber, rubber-like, compressible polymer or fabric tape wrapped about post 30. For example, the tape may be formed from of a resiliently compressible material, such as urethane, polytetrafluoroethylene (TEFLON), nylon, fabric, and/or plastic. In some implementations, the tape may include an adhesive for further securement of the tape about post 30. In some implementations, the tape may be elastic, being stretched about post 30 and having its end adhesively secured to itself or to post 30. In some implementations, the tape wrapped about post 30 may form a single layer of material. In some implementations, the tape may be wrapped about itself such that each of layers 32 is composed of multiple overlapping layers.

In the example illustrated, layers 32 continually extend about the exterior of post 30, at the selected axial locations, without interruption. In other implementations, layers 32 may include such interruptions about the circumference of post 30. In some implementations, each of layers 32 may include multiple circumferentially spaced segments or bands which are circumferentially spaced apart from one another about post 30 or partially about post 30, such as on one side of post 30.

Claws 36 are secured to post 30 at axially spaced positions along post 30. Claws 36 are configured to engage the side of a tree to grip the tree and assist in retaining the climbing stick along the tree. In some implementations, claws 36 may include a series of teeth to assist in gripping the bark or sides of a tree. Claws 36 may include a pair of diverging and angled wings 38 forming a pair of angled toothed edges that extend away from post 30 to form a tree receiving opening adjacent the convex side of the angled wings.

To facilitate stacking and retention of multiple similar climbing sticks 24 in an axially offset relationship, layers 32 and claws 36 are not symmetrically located along the axis of post 30. Claw 36-1 is coupled to post 30 between layer 32-1 and the axial end 46 of post 30. In contrast, claw 36-2 is coupled to post 30 between layer 32-2 and the axial end 46 of post 30. In other words, layer 32-2 is between claw 36-2 and the end 48 of post 30.

In some implementations, claws 36 are separate and distinct from steps (not shown in FIG. 1) supported by post 30 generally between claws 36. For example, additional steps may be integrally formed as part of post 30 or individually mounted to post 30. In yet other implementations, claws 36 may be configured so as to concurrently serve as steps for climbing stick 2 four 4. In some implementations, claws 36 may be coplanar with such steps. In some implementations, claws 36 may be integrally formed as single unitary bodies with each of the corresponding steps.

Each of claws 36 further comprises an open sided channel sized to receive a portion of an inwardly compressible layer of another similar climbing stick 24. Claws 36-1 and 36-2 comprise open sided channels 42-1 and 42-2 (collectively referred to as channels 42), respectively, which are sized to receive and resiliently compress portions of inwardly compressible layer 32-1 and 32-2 of another climbing stick 24. For example, in some implementations, each of channels 42 may have a radius less than the radius of the outer surface of the corresponding layer 32. In some implementations, channels 42 are formed on the convex side of claws 36, so as to face away from the tree when the climbing stick is in use along the tree. In some implementations, channels 42 are formed on the concave side of claws 36, so as to face towards the tree when the climbing stick is in use along the tree.

Figure 3:
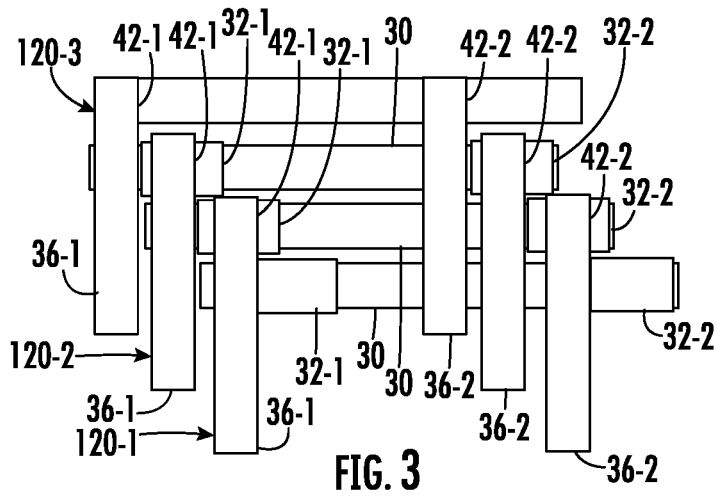
FIG. 3 is a side view of the climbing stick system with three of the example climbing sticks of FIG. 2 stacked and joined to one another.
Figure 2:
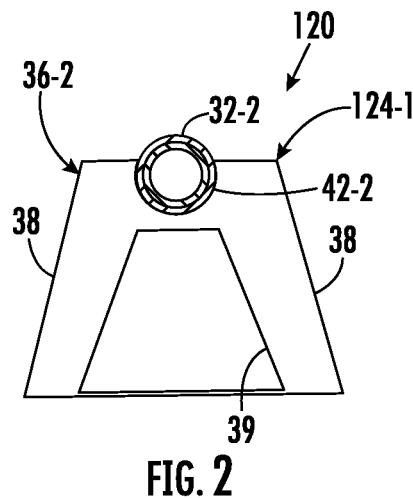
FIG. 2 is an end view of an example climbing stick.

FIG. 2 illustrates climbing stick 124-1, one example of climbing stick 20 described above. Climbing stick 124-1 is similar to climb stick 24 except that channels 42 are specifically illustrated as being located on the convex side of claws 36, the side of claws 36 configured to face in a direction away from the tree trunk when the climbing stick is mounted to the tree. FIG. 3 illustrates the stacking of multiple climbing sticks 124-1, 124-2 and 124-3 (collectively referred to as climbing sticks 124) and the releasable connection of the multiple climbing sticks 124. As shown by FIG. 3, the multiple climbing sticks 124 are axially offset when stacked.

In the example illustrated, channels 42-1 and 42-2 of climbing stick 124-1 are receiving and resiliently compressing layers 32-1 and 32-2, respectively, of climbing stick 124-2 to secure and retain climbing stick 124-2 and climbing stick 124-1 in a stacked relationship. Channels 42-1 and 42-2 of climbing stick 124-2 are receiving and compressing layers 32-1 and 32-2, respectively, of climbing stick 124-3 to secure and retain climbing stick 124-3 and climbing stick 124-2 in a stacked relationship.

Figure 5:
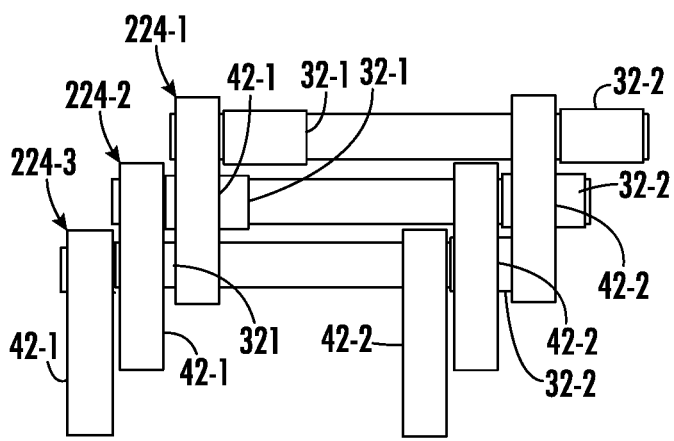
FIG. 5 is a side view of the climbing stick system with three of the example climbing sticks of FIG. 4 stacked and joined to one another.
Figure 4:
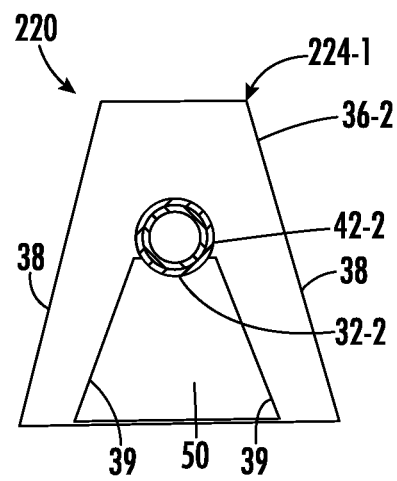
FIG. 4 is an end view of an example climbing stick.

FIG. 4 illustrates climbing stick system 220, a portion of which comprises climbing stick 224-1, one example of climbing stick 20 described above. Climbing stick 224-1 is similar to climb stick 24 except that channels 42 are specifically illustrated as being located on the concave side of claws 36, the side of claws 36 configured to abut and, in some implementations, partially wrap about the side of a tree trunk. Channels 42 are located between the angled edges 39 of wings 38 that form the tree receiving opening 50. FIG. 5 illustrates the stacking of multiple climbing sticks 224-1, 224-2 and 224-3 (collectively referred to as climbing sticks 224) and the releasable connection of the multiple climbing sticks 224. As shown by FIG. 3, the multiple climbing sticks 224 are axially offset when stacked.

In the example illustrated, channels 42-1 and 42-2 of climbing stick 124-1 are receiving and resiliently compressing layers 32-1 and 32-2, respectively, of climbing stick 124-2 to secure and retain climbing stick 124-2 and climbing stick 124-1 in a stacked relationship. Channels 42-1 and 42-2 of climbing stick 124-2 are received and compressing layers 32-1 and 32-2, respectively, of climbing stick 124-3 to secure and retain climbing stick 124-3 and climbing stick 124-2 in a stacked relationship. Because channels 42 are formed on the concave side of claws 36, each of claws 36 may be further extended from the tree receiving opening to concurrently serve as a step, wherein channels 42 do not subtract from the overall surface area available for serving as a step. In those implementations where such steps are separate structures from claws 36, the size of claws 36 may be reduced to reduce the weight and size of each of climbing sticks 224.

In each of the above example implementations, layers 32 are illustrated and described as being secured to post 30, wherein such layers 32 are removably received within channels 42 when multiple identical climbing sticks are axially offset and stacked. In other implementations, layers 32 may not be provided on post 30, but may instead be formed on the inner surfaces of channels 42, wherein such layers 32 are resiliently compressed when portions of post 30 of other climbing sticks are inserted into channels 42. Although an option, such a construction may result in a more difficult manufacturing process.

Figure 6:
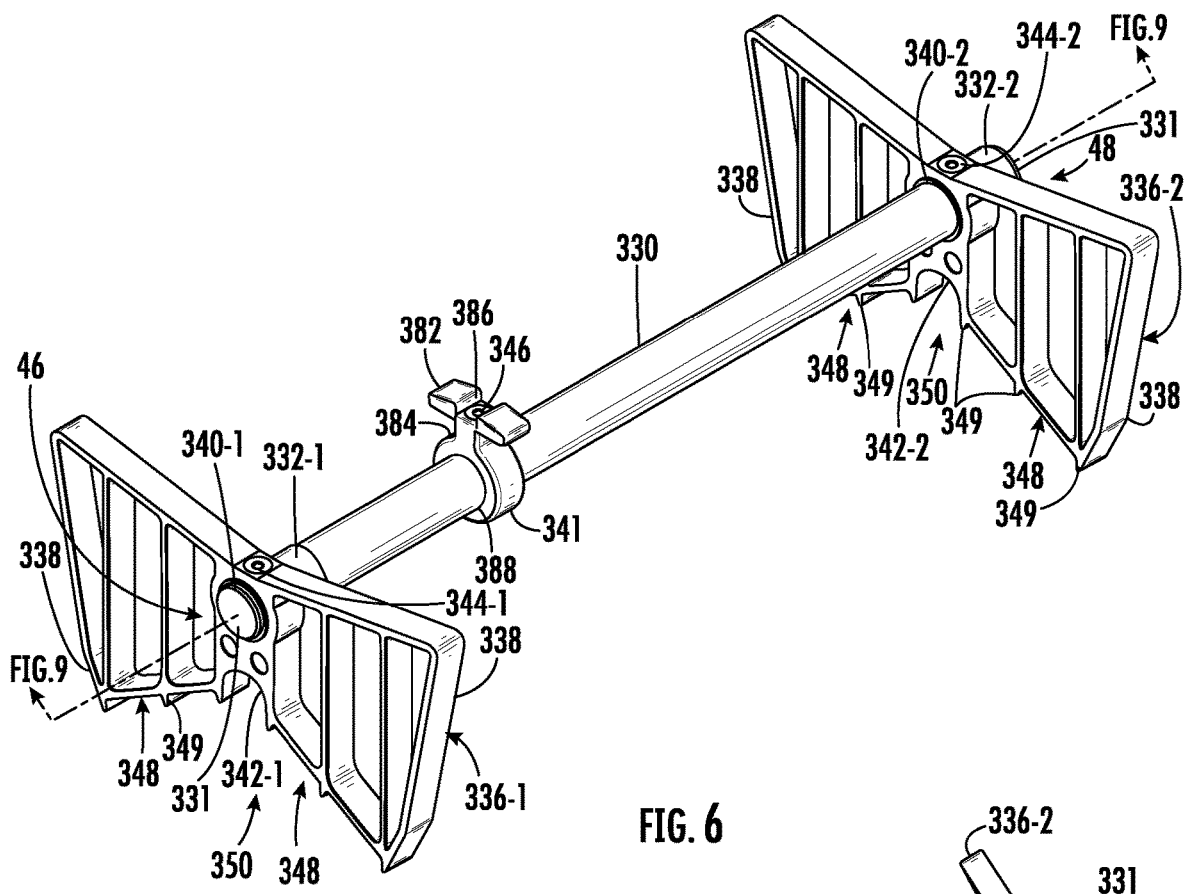
FIG. 6 respective view of an example climbing stick of an example climbing stick system.
Figure 7:
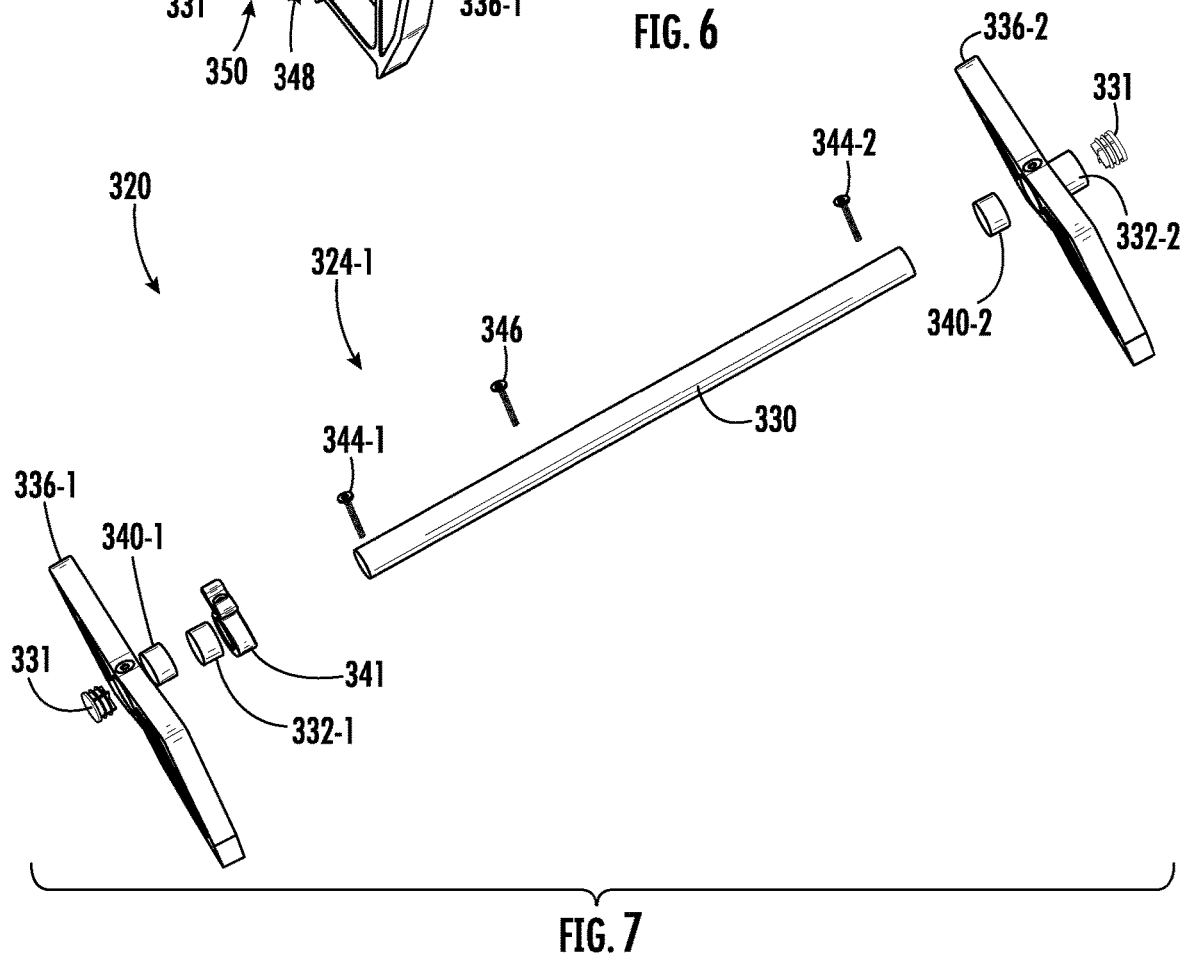
FIG. 7 is an exploded perspective view of the climbing stick of FIG. 6.

FIGS. 6 and 7 illustrate an example climbing stick 324-1 which is part of a larger example climbing stick system 320. FIG. 7 is an exploded perspective view of the climbing stick 324-1 shown in FIG. 6. In some implementations, the example climbing stick system 320 may include multiple similar or identical climbing sticks 324 which may be stacked and releasably held together for transport and storage. Climbing stick 324-1 comprises post 330, caps 331, inwardly compressible layers 332-1, 332-2 (collectively referred to as layers 332), claws 336-1, 336-2 (collectively referred to as claws 336), lock wedges 340-1, 340-2 (collectively referred to as lock wedges 340), cleat 341, fasteners 344-1, 344-2 (collectively referred to as fasteners 344), and fastener 346.

Post 330 comprises a structure interconnecting and supporting claws 336. Post 330 may comprise an elongate tube having a circular, oval or polygonal cross-section. Post 330 may be formed from a metal, such as aluminum, a polymer or other material such as a carbon fiber material. Post 330 has a length of at least 100 mm and no greater than 1000 mms o as to support claws 336 for supporting steps along a tree.

Caps 331 fit within the hollow tubular axial ends of post 330 to close or plug such open ends. In some implementations, caps 331 may be omitted.

Inwardly compressible layers 332 extend along exterior portions of post 330. Layers 332 are formed from a resiliently compressible material such as a rubber or rubber-like material. Examples of the material from which layers 332 are formed include, but are not limited to, urethane, polytetrafluoroethylene (TEFLON), nylon, fabric, plastic. Layers 332 are configured to be inwardly compressed while releasably retaining another climbing stick in a stacked relationship to climbing stick 324-1. Layers 332 may have a Shore A durometer of no greater than 100 for securing an adjacent stacked climbing stick.

In the example illustrated, each of layers 332 comprises a tube or sleeve of resiliently compressible material that is slid over and along post 330 to a selected location and then is heat shrunk about the post 330 to secure the layer 332 in place. In some implementations, an additional layer of adhesive may be applied between each of layers 332 and post 330. In the example illustrated, post 330 has a cylindrical cross-section and a uniform diameter along its length, wherein the combined diameter of post 330 and an individual layer 332-1 or 332-2 is equal to the diameter of post 30 and twice the thickness of the heat shrunk sleeve wall providing layer 332-1 or 332-2.

In some implementations, post 330 may have a slightly recessed or smaller diameter in those portions that are to underlie layers 332-1 and 332-2, wherein such circumferential recesses assist in locating the individual sleeves forming layers 332 prior to the heat shrinking of the sleeves. Such recesses may further assist in inhibiting axial sliding of the sleeves following the drinking of the sleeves. In such implementations, the recess may have a depth less than the thickness of the sleeve such that layers 332 projects beyond the surrounding exterior surface of post 330.

In other implementations, layers 332 may be formed and/or secured to post 330 in other fashions. For example, in some implementations, the sleeves forming layers 332 may not be heat shrunk but may be merely adhesively bonded or joined to post 330. In some implementations, the sleeves forming layers 332 may not be heat shrunk but may be slid along post 330 until being resiliently snapped or popped into the circumferential recesses formed in post 330. In some implementations, the circumferential recesses into which the sleeves forming layers 332 are resiliently popped may include an adhesive for further securing and retaining the sleeves within the recesses in selected axial positions along post 330. In some implementations, post 330 may include apertures at selected locations along post 330, whereas the sleeves forming layer 332 may include projections or plugs extending from the inner diameter of the sleeve, wherein the projections or plugs are resiliently popped or snapped into the apertures to axially retain the sleeves in place along post 330. In some implementations, layers 332 may be coated upon or molded about post 330.

In some implementations, layers 332 may each comprise a rubber, rubber-like, compressible polymer or fabric tape wrapped about post 330. For example, the tape forming each layer 332 may be formed from a resiliently compressible material, such as urethane, polytetrafluoroethylene (TEFLON), nylon, fabric, and/or plastic. In some implementations, the tape may include an adhesive for further securement of the tape about post 330. In some implementations, the tape may be elastic, being stretched about post 330 and having its end adhesively secured to itself or to post 330. In some implementations, the tape wrapped about post 330 may form a single layer of material. In some implementations, the tape may be wrapped about itself such that each of layers 332 is composed of multiple overlapping layers.

In the example illustrated, layers 332 continually extend about the exterior of post 330, at the selected axial locations, without interruption. In other implementations, layers 332 may include such interruptions about the circumference of post 330. In some implementations, each of layers 332 may include multiple circumferentially spaced segments or bands which are circumferentially spaced apart from one another about post 330 or partially about post3 30, such as on one side of post 330.

Claws 336 are secured to post 330 at axially spaced positions along post 330. Claws 336 are configured to engage the side of a tree to grip the tree and assist in retaining the climbing stick along the tree. In some implementations, claws 336 may include a series of teeth to assist in gripping the bark or sides of a tree. Claws 336 may include a pair of diverging and angled wings 338 forming a pair of angled toothed edges 348 having teeth 349, wherein the Tuesday edges 348 extend away from post 330 to form a tree receiving opening 350 adjacent the convex side of the angled wings.

To facilitate stacking and retention of multiple similar climbing sticks 324 in an axially offset relationship, layers 332 and claws 336 are not symmetrically located along the axis of post 330. Claw 336-1 is coupled to post 330 between layer 332-1 and the axial end 46 of post 30. In contrast, claw 36-2 is coupled to post 330 between layer 332-2 and the axial end 46 of post 330. In other words, layer 332-2 is between claw 336-2 and the end 48 of post 330.

In the example illustrated, claws 336 are configured so as to concurrently serve as steps for climbing stick 324. In the example illustrated, claws 336 are coplanar with such steps. In the example illustrated, claws 336 may be integrally formed as single unitary bodies with each of the corresponding steps. In some implementations, claws 336 are separate and distinct from steps supported by post 330 generally between claws 336. For example, additional steps may be integrally formed as part of post 330 or individually mounted to post 330.

Each of claws 336 further comprises an open sided channel sized to receive a portion of an inwardly compressible layer of another similar climbing stick 324. Claws 336-1 and 336-2 comprise open sided channels 342-1 and 342-2 (collectively referred to as channels 342), respectively, which are sized to receive and resiliently compress portions of inwardly compressible layer 332-1 and 332-2 of another climbing stick 324. For example, in some implementations, each of channels 342 may have a radius less than the radius of the outer surface of the corresponding layer 332. In the example illustrated, channels 342 are formed on the concave side of claws 336, so as to face towards the tree when the climbing stick is in use along the tree.

Figure 8:
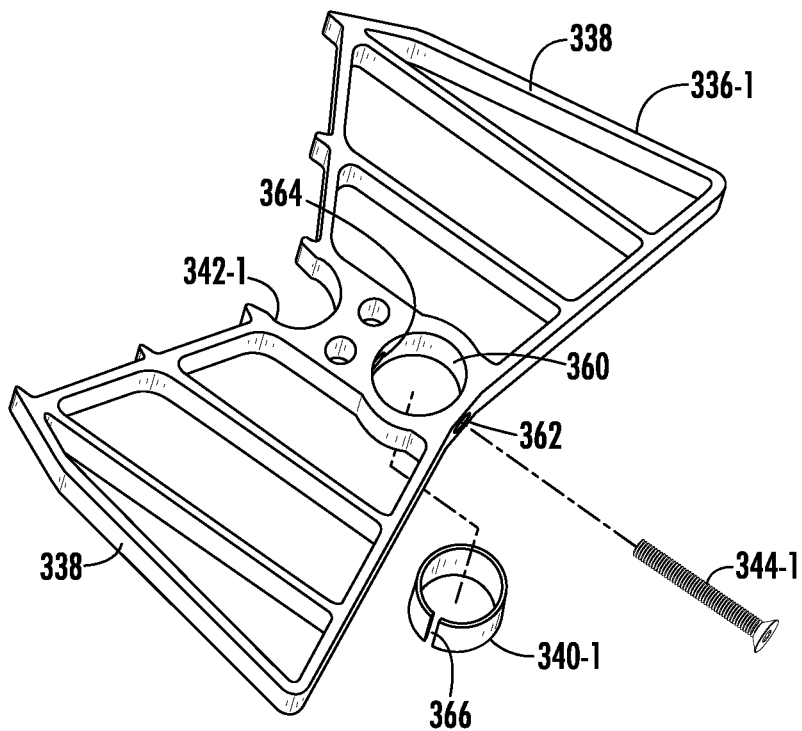
FIG. 8 is a perspective view of an example claw, lock wedge and fastener of the climbing stick of FIG. 6.

Lock wedges 340 and fasteners 344 secure claws 336 in place along post 330. FIG. 8 is an enlarged view of claw 336-1, lock wedge 340-1 and fastener 344-1. Claw 336-2, lock wedge 340-2 and faster 344-2 are similar. As shown by FIG. 8, claw 336-1 comprises a tapered bore 360, entry bore 362 and internally threaded bore 364.

Tapered bore 360 extends through claw 336-1 at a location between wings 338 and aligned with channel 342-1. Tapered bore 360 is tapered, having an inner diameter that narrows along its axial length. Entry bore 362 and internally threaded bore 364 extend on opposite sides of tapered bore 360. In the example illustrated, entry bore 362 comprise a countersunk bore to receive the head of fastener 344-1 and extends to the interior of tapered bore 360, being aligned with internally threaded bore 364. Internally threaded bore 364 extends from tapered bore 360 towards channel 342-1. In the example illustrated, internally threaded bore 364 comprises a blind hole. In other implementations, bore 364 may extend through claw 336-1 to communicate with the interior of channel 342-1. Internally threaded bore 364 is internally threaded to threadably receive the threads of fastener 344-1.

Lock wedge 340-1 comprises a split tube or ring having an axial slot 366. Lock wedge 340-1 has an inner shape that corresponds to the outer surface shape of post 330. Lock wedge 340-1 has an outer shape that corresponds to the interior surface shape of bore 360. In the example illustrated in which bore 360 is tapered, the outer surface of wedge 340-1 has a correspondingly tapered outer surface. The outer surface of wedge 341 has a first diameter at one axial end and narrows to a second smaller diameter at the opposite axial end. Although bore 360 and the outer surface of lock wedge 340-1 are both illustrated as having circular cross-sections, in other implementations, bore 360 and the outer surface of lock wedge 340-1 may have other corresponding cross-sectional shapes such as oval or polygonal cross-sectional shapes.

Figure 9:
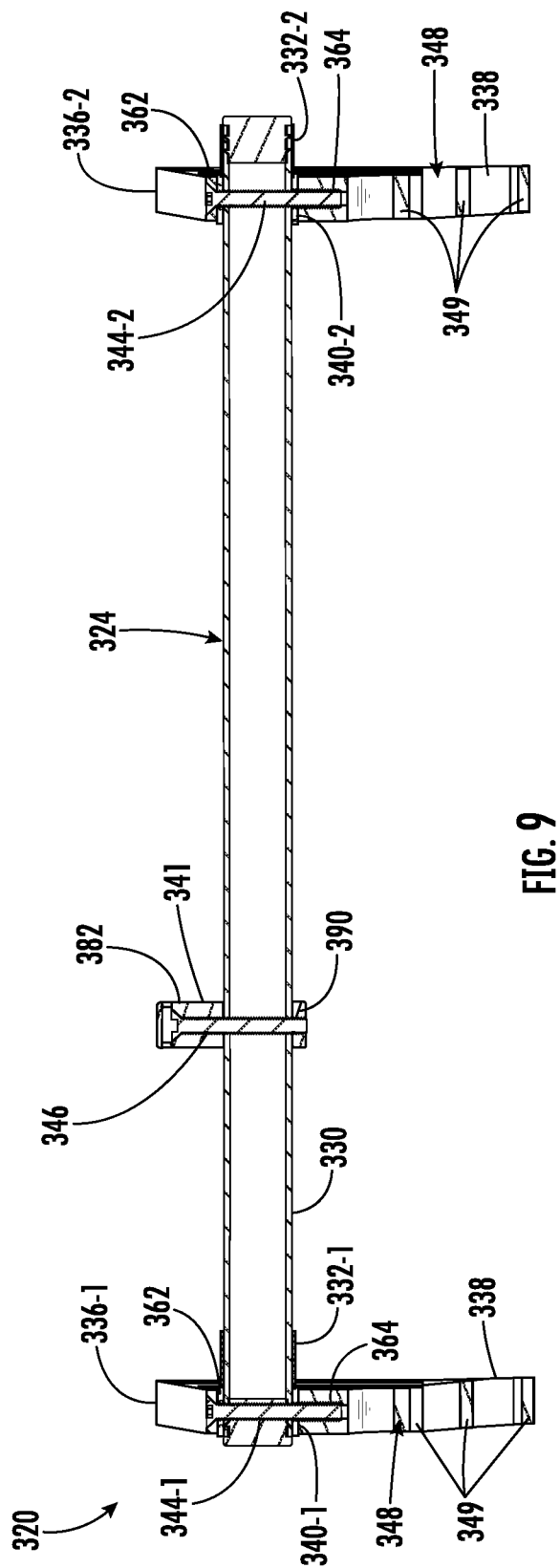
FIG. 9 is a sectional view of the climbing stick of FIG. 6 taken along line 9-9.
Figure 10:
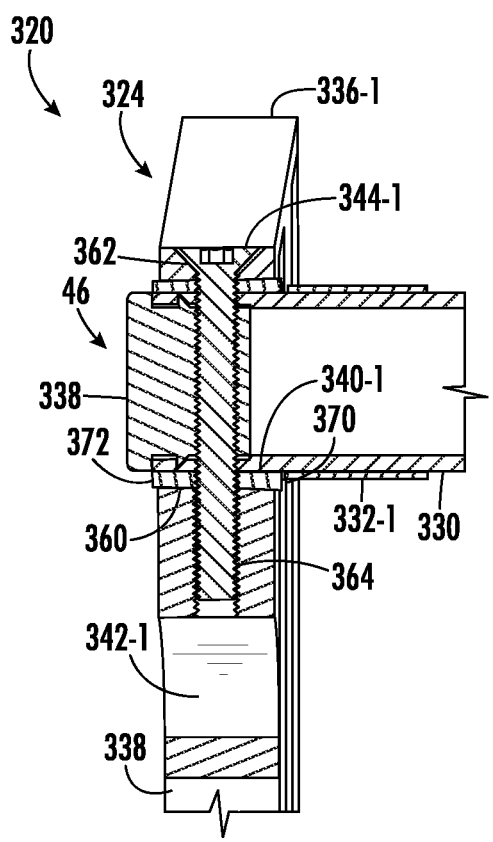
FIG. 10 is an enlarged sectional view of a left portion of the climbing stick of FIG. 9.

FIGS. 9 and 10 are sectional views illustrating lock wedge 340-1 and fastener 344-1 securing claw 336-1 to post 330. FIG. 10 is an enlarged view of the left side of climbing stick 324 as seen in FIG. 9. As shown by FIG. 10, lock wedge 340-1 has a uniform inner diameter along its length and has an outer diameter that tapers are narrows from a first end 370 to a second opposite end 372. In the example illustrated, bore 360 has a corresponding taper. Lock wedge 340-1 is wedged between post 330 and the interior surface of bore 360. Lock wedge 340-1 forms a tight fit between post 330 and the interior surfaces of bore 360, accommodating or filling any spaces that may result from manufacturing variations or tolerances. Because lock wedge 340-1 is in close abutting contact with both the exterior surface of post 330 and the interior surfaces of bore 360, lock wedge 340-1 inhibits any relative movement between post 330 and claw 336-1, reducing noise and reducing abrasion or wear of claw 336-1 and post 330. Because lock wedge 340-1 accommodates any manufacturing variations or tolerances, the manufacturer post 330 and claw 336-1 may be less precise, permitting the manufacture of post 330 and claw 336-1 to be less complex and less expensive. Because lock wedge 340-1 reduces relative movement between post 330 and claw 336-1, lock wedge 340-1 reduces stress upon post 330 and potential deformation or wear of post 330 that might be otherwise be caused by such relative movement. As a result, post 330 may be formed from thinner and/or more lightweight materials. For example, in some implementations, lock wedge 340-1 may facilitate the use of a post 330 formed from aluminum and having a wall thickness of less than 6 mm, reducing both cost and weight. In some implementations, lock wedge 340-1 may facilitate the use of a post 330 formed from a carbon fiber, reducing the weight of climbing sticks 324-1.

In some implementations, lock wedge 340-1 is initially slid over post 330. Thereafter, post 330 and the surrounding lock wedge 340-1 are inserted into bore 360. A cylindrical wedging tool having an interior diameter greater than the exterior diameter of post 330 but less than the exterior diameter of lock wedge 340-1 may be positioned over post 330 and axially pounded to drive lock wedge 340-1 between post 330 and the interior surface of bore 360 of claw 336-1. In other implementations, lock wedge 340-1 may be secured between claw 336-1 and post 330 in other fashions. Lock wedge 340-2 may be similarly positioned between post 330 and bore 360 of claw 336-2.

As further shown by FIG. 10, fastener 344-1 extends through entry port 362, through lock wedge 340-1, through post 330 and into internally threaded bore 364 to axially secure claw 336-1 along post 330. In the example illustrated, fastener 362 has a head received within a countersunk opening of entry bore 362 and is moved through cap 331 and threaded into bore 364. In some implementations, once post 330 has been inserted through bore 360 and once lock wedge 345 1 has been wedge between post 330 and claw 336-1, a drill may be guided by entry bore 362 so as a drill through lock wedge 34-1, through post 330 and through cap 331 until reaching bore 364. Thereafter, fastener 344-1 is passed through entry bore 362 and through the drilled bore until the threaded portion of fastener 344-1 may be threaded into bore 364.

Figure 11:
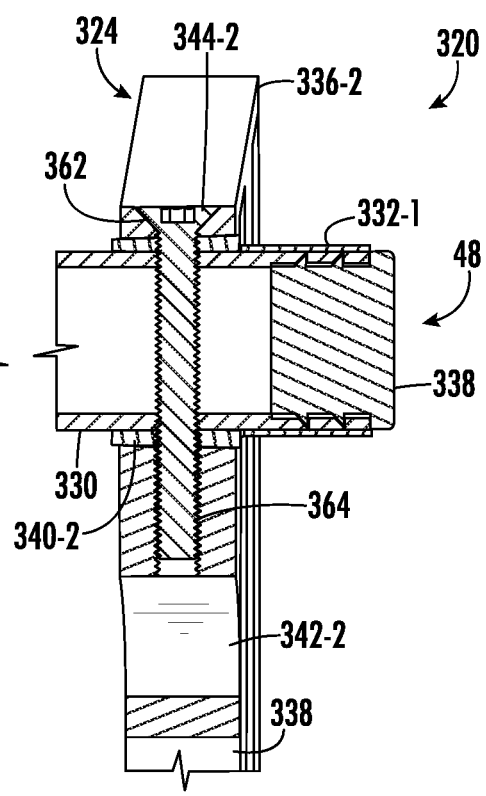
FIG. 11 is an enlarged sectional view of a right portion of the climbing stick of FIG. 9.

FIG. 11 is an enlarged view of the right side of climbing stick 324 as seen in FIG. 9. As shown by FIG. 11, lock wedge 340-2 and fastener 344-2 are similar to lock wedge 340-1 and fastener 344-1, respectively. Lock wedge 340-2 and fastener 344-2 secure claw 336-2 to the right side of post 330 in a fashion similar to lock wedge 340-1 and fastener 344-1 as described above. As noted above, claw 336-1 is secured to post 330 between layer 332-1 and the axial end 46 of post 330. In contrast, claw 336-2 is secured to post 330 between layer 332-2 and the axial end 46 of post 330. This distinction facilitates the axial offset stacking of multiple similar identical climbing sticks 324.

Although fasteners 344 are illustrated as comprising externally threaded bolts which are threaded into internally threaded bore 364 provided in the respective claws 336, in other implementations, fasteners 344 may be secured in other fashions or may other configurations. For example, claw 336 may alternatively include an unthreaded bore in place of threaded bore 364 and may include a separate threaded nut for being threaded onto the end of fastener 344. In some implementations, each of fasteners 344 may comprise a spring pin, also referred to as a roll pin or tension pin, which has an outer diameter greater than the outer diameter of a passage extending through claw 336, lock wedge 340, and post 330 (in place of entry bore 362, threaded bore 364 and the drilled or otherwise formed intermediate bore). The spring pin may be compressed during insertion and resiliently engages the interior of the passage so as to be retained in place, further axially securing claw 336 in place along post 330.

Figure 12:
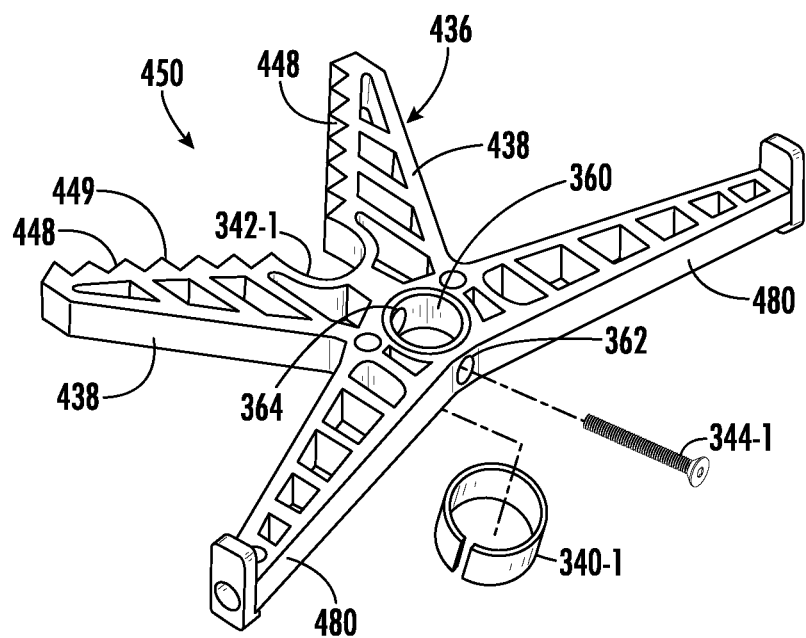
FIG. 12 is a perspective view of an example claw, lock wedge and fastener for use as part of the climbing stick of FIG. 6.

FIG. 12 is a perspective view illustrating an alternative claw 436 and the associated lock wedge 340-1 and fastener 344-1 which may be used as part of tree climbing stick 324-1 and as part of climbing stick system 320 in place of claw 336-1, lock wedge 340-1 and fastener 344-1 described above. The illustrated claw 436 may likewise be used in place of claw 336-2 as part of system 320 and as part of any of the other climbing sticks 324 of system 320. Lock wedge 340-1 and fastener 344-1 are similar to the lock wedge 340-1 and fastener 344-1 used with claw 336-1.

Like claw 336-1, claw 436 is configured to serve as both a tree gripping claw and a step for the climbing stick. Claw 436 comprise wings 438 which include angled toothed edges 448 about a tree receiving opening 450. Edges 448 each include a series of teeth 449.

In contrast to claw 336-1, claw 436 includes more distinct step portions 480 which angle away from wings 438. Similar to claw 336-1, claw 436 comprises side opening channel 342-1, tapered bore 360, entry bore 362 and internally threaded bore 364 (described above). As with claw 336-1, claw 436 is secured to post 330 by wedging lock wedge 340-1 between the interior surfaces of bore 360 and post 330. Thereafter, fast 344-1 is passed through a drilled opening formed in lock wedge 340-1 and post 330 and is threaded into internally threaded bore 364. Test discussed above, in other implementations, other fasteners and configurations may be used in place of fastener 344-1 and the internally threaded bore 364. In some implementations, fasteners 344 may be omitted, wherein claws 336 or 436 are further axially secured by an adhesive or epoxy deposited or applied between post 330 and the interior surfaces of lock wedge 340-1.

As shown by FIGS. 6 and 9, cleat 341 projects from post 330 in a direction generally opposite to the direction in which side opening channels 342-1 and 342-2 face. Cleat 341 is secured to post 330 and has a head portion 382 and a narrower neck portion 384 about which a strap, rope, cable the like may be wrapped and retained. Head portion 382 comprises an axially extending notch 386 sized to partially receive the side of post 330 of another stacked climbing stick 324.

In the example illustrated, cleat 341 comprise a ring portion 388 that extends about post 330 and which is slid along post 330 to a desired location. At such a location, fastener 346 is passed through head portion 382 and through post 330, into and internally threaded bore 390 provided in the ring portion 388 (as shown in FIG. 9). In other implementations, cleat 341 may be secured to post 330 in other fashions such as with other fasteners, adhesives, C-clamps and the like. In some implementations, cleat 341 may be integrally formed as part of a single unitary body with post 330. In some implementations, cleat 341 may be omitted.

In some implementations, cleat 341 may be secured to post 330 using a lock wedge, similar to the lock wedge is used to secure claws 336 two post 330. In particular, cleat 341 may include a tapered bore, similar to bore 360, which receives a lock wedge, similar to lock wedge 340-1 or 340-2, which is wedge between post 330 and the interior surfaces of the tapered bore. In some implementations, claws 336 and cleat 341 may be secured to post 330 using other constructions with or without lock wedges.

FIGS. 13 and 14 illustrate stacking and releasable connection of climbing sticks 324-1 and underlying climbing stick 324-2 as part of climbing stick system 320. Climbing sticks 324-1 and 324-2 are substantially identical to one another. As shown by FIG. 13, climbing stick 324-1 is axially offset relative to climbing stick 324-2 in the direction indicated by arrow 392 and is then lowered onto climbing stick 324-2 in the direction indicated by arrow 393. During such lowering, side opening channels 342-1 and 342-2 move over and about the inwardly compressible layer 332-1 and 332-2, respectively, of climbing stick 324-2. In some implementations, channels 342 may resiliently spread or expand as they are positioned over layers 332. As a result of such lowering, portions of post 330 of climbing stick 324-1 move into and rest against the sides of notch 386 of cleat 341 of climbing sticks 324-2. As a result, cleat 341 inhibits rotation of climbing stick 324-2 about its longitudinal axis. In some implementations, the interior surface of notch 386 may additionally be coated with a high friction material such as a rubber a rubber-like material to assist in gripping a received post. In such an implementation, cleat 341 of climbing stick 324-2 may further assist in inhibiting rotation of climbing stick 324-1 about the longitudinal axis of post 330 of climbing stick 324-1.

Figure 15:
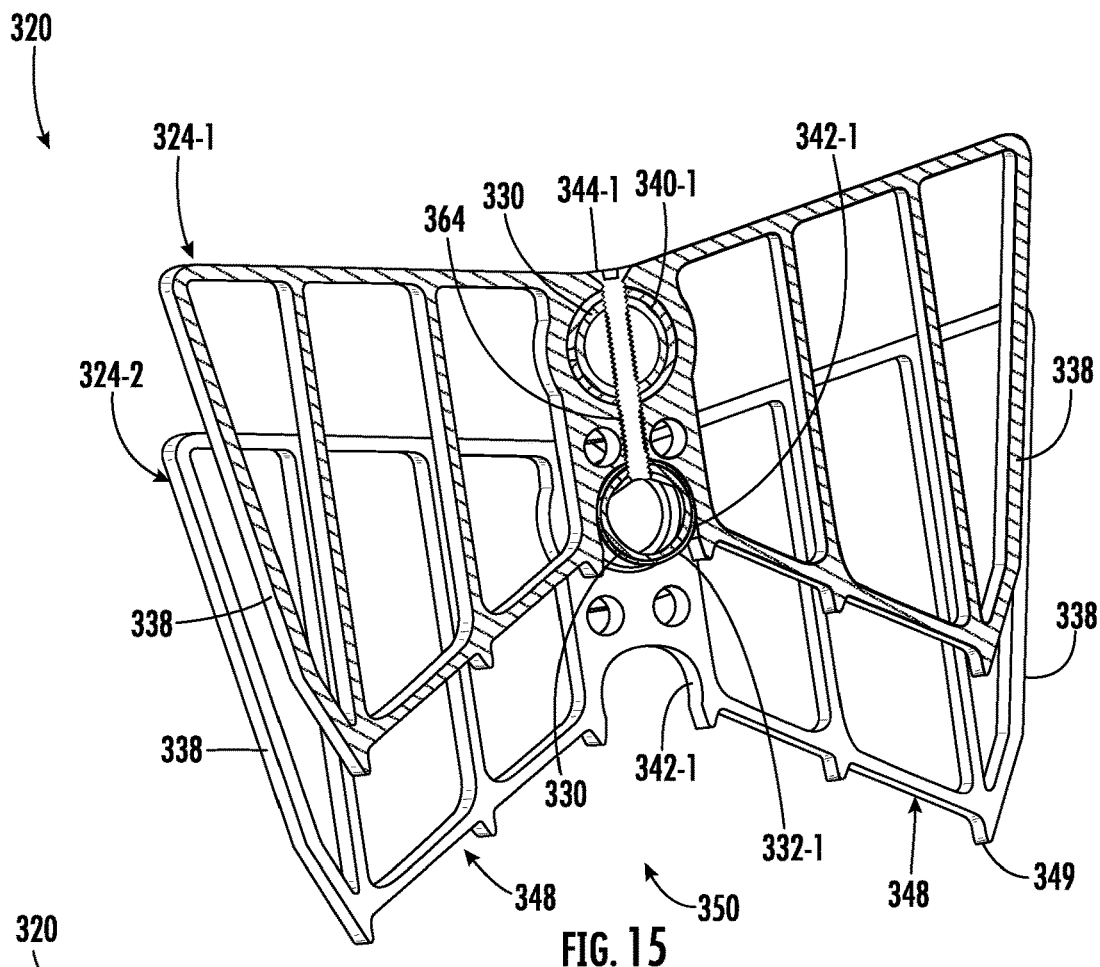
FIG. 15 is a sectional view of the climbing stick system of FIG. 14 taken along line 15-15.
Figure 16:
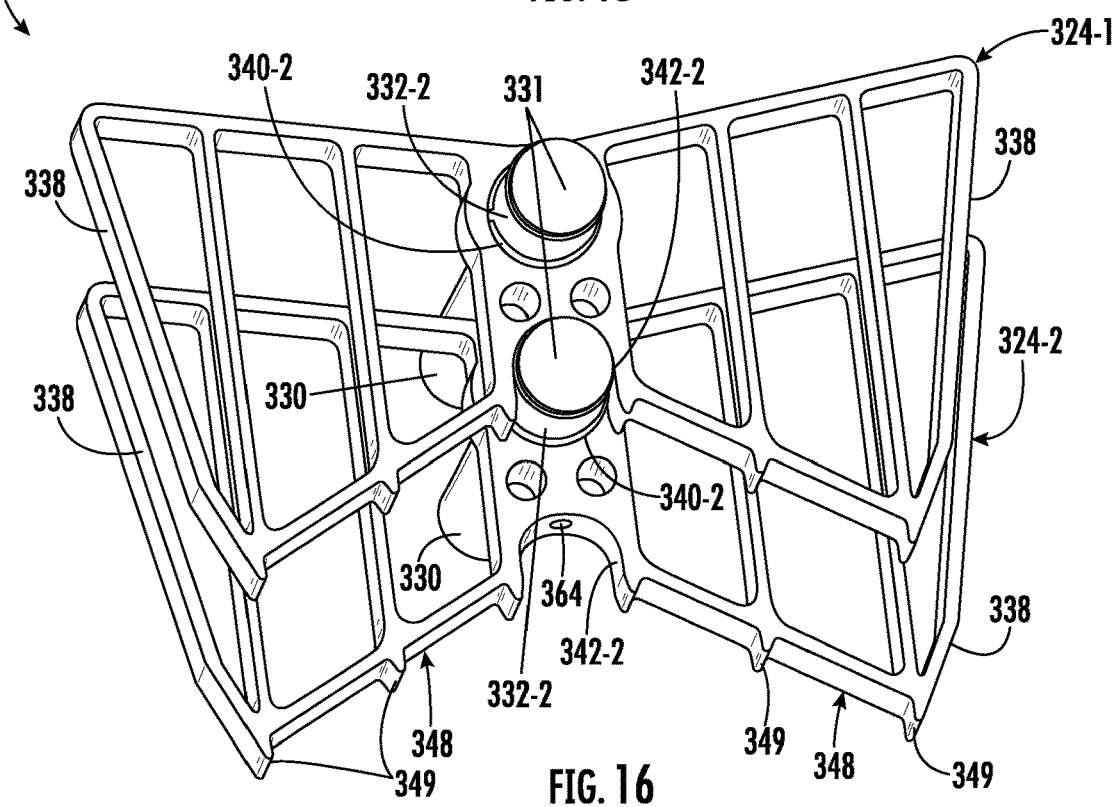
FIG. 16 is an end view of the climbing stick system of FIG. 14 taken along line 16-16.

FIG. 15 is a sectional view of the stacked and joined climbing sticks 324 taken along line 15-15 of FIG. 14. FIG. 16 is a fragmentary end of the stacking joined climbing sticks 324 of climbing stick system 320 taken along line 16-16 of FIG. 14. As shown by FIG. 15, channel 342-1 of climbing stick 324-1 is receiving and resiliently compressing layer 332-1 of climbing stick 324-2 to secure and retain climbing stick 324-2 and climbing stick 324-1 in a stacked relationship. As shown by FIG. 16, channel 342-2 of climbing stick 324-1 is receiving and resiliently compressing layer 332-2 of climbing stick 324-2 to secure and retain climbing stick 324-2 and climbing stick 324-1 in the stacked relationship. Although system 320 is illustrated as comprising a stack of two separate climbing sticks 324, climbing stick system 320 may include additional similar climbing sticks 324 which may likewise be axially offset with respect to and releasably joined to the existing stack of climbing sticks formed by climbing sticks 324-1 and 324-2.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A climbing stick system comprising:
   a plurality of climbing sticks comprising a first climbing stick and a second climbing stick, each of the first climbing stick and the second climbing stick comprising:
   a post;
   a first inwardly compressible layer on the post and proximate a first end of the post;
   a second inwardly compressible layer on the post and proximate a second end to the post;
   a first claw projecting from the post between the first inwardly compressible layer and the first end, the first claw comprising a first open sided channel sized smaller than a combined size of the first inwardly compressible layer and the post; and
   a second claw projecting from the post between the second inwardly compressible layer and the first inwardly compressible layer, the second claw comprising a second open sided channel sized smaller than a combined size of the second inwardly compressible layer and the post,
   wherein the first climbing stick is stackable on the second climbing stick with the first open sided channel of the first climbing stick receiving and compressing the first inwardly compressible layer of the second climbing stick and with the second open sided channel of the first climbing stick receiving and compressing the second inwardly compressible layer of the second climbing stick.

2. The climbing stick system claim 1, wherein the post is cylindrical.

3. The climbing stick system of claim 1, wherein the first claw comprises first and second angled toothed edges and wherein the first open sided channel is between the first and second angled toothed edges.

4. The climbing stick system of claim 1, wherein the first inwardly compressible layer comprises a tube of material heat shrunk about the post.

5. The climbing stick system of claim 1, wherein the first inwardly compressible layer is adhesively bonded to the post.

6. The climbing stick system of claim 1 further comprising:
a first step integrally formed as a single unitary body with the first claw; and
a second step integrally formed as a single unitary body with the second claw.

7. The climbing stick system of claim 1, wherein the first claw and the second claw face away from the post in a first direction, the system further comprising a cleat projecting from the post and facing in a second direction opposite the first direction, the cleat comprising a notch, wherein the notch of the first climbing stick is sized to receive a portion of the post of the second climbing stick when the first climbing stick and the second climbing stick are stacked.

8. The climbing stick system of claim 7, wherein the notch comprises a compressible layer of material.

9. The climbing stick system of claim 1, wherein the first open sided channel and the second open sided channel each have a mouth having a width smaller than a diameter of the post.

10. The climbing stick system of claim 1, wherein the post is formed from one of a carbon fiber and material and a metal and wherein the first inwardly compressible layer is formed from one of a rubber, a synthetic rubber, and a polymer.

11. The climbing stick system of claim 1, wherein the first claw comprises a tapered bore, wherein the post is cylindrical and is received within the tapered bore and wherein the system furthering comprising a tubular lock wedge between the post and the tapered bore, the lock wedge having a cylindrical interior and a tapered exterior.

12. The climbing stick system of claim 11 further comprising a fastener passing through the first claw, through the tubular wedge and through the post.

13. The climbing stick system of claim 12, wherein the post is formed from a carbon fiber material.

14. The climbing stick system of claim 1, wherein the post has a first outer diameter, wherein the first inwardly compressible layer has a second outer diameter greater than the first outer diameter, and wherein the first inwardly compressible layer has a thickness of at least 0.2 mm and a Shore A durometer of no greater than 100.

15. A climbing stick system comprising:
a first climbing stick comprising:
a first post;
a first claw projecting from the first post, the first claw having a first open sided channel;
a second climbing stick stacked upon and in an axially offset relationship to the first climbing stick, the second climbing stick comprising:
a second post received within the first open sided channel;
a second claw projecting from the second post, the second claw having a second open sided channel; and
a compressible layer compressed between an interior of the first open sided channel and the second post.

16. A climbing stick comprising:
a post;
a first inwardly compressible layer on the post and proximate a first end of the post;
a second inwardly compressible layer on the post and proximate a second end to the post;
a first claw projecting from the post between the first inwardly compressible layer and the first end, the first claw comprising a first open sided channel sized smaller than a combined size of the first inwardly compressible layer and the post; and
a second claw projecting from the post between the second inwardly compressible layer and the first inwardly compressible layer, the second claw comprising a second open sided channel sized smaller than a combined size of the second inwardly compressible layer and the post.

17. The climbing stick of claim 16, wherein the first inwardly compressible layer comprises a tube of material heat shrunk about the post.

18. The climbing stick of claim 16, wherein the first inwardly compressible layer is adhesively bonded to the post.

19. The climbing stick of claim 16, wherein the first claw and the second claw face away from the post in a first direction, the climbing stick further comprising a cleat projecting from the post and facing in a second direction opposite the first direction, the cleat comprising a notch sized to receive a portion of the post of a second climbing stick when the climbing stick and the second climbing stick are stacked.

20. The climbing stick of claim 16, wherein the post has a first outer diameter, wherein the first inwardly compressible layer has a second outer diameter greater than the first outer diameter, and wherein the first inwardly compressible layer has a thickness of at least 0.2 mm and a Shore A durometer of no greater than 100.

* * * * *